United States Patent [19]

Miyazaki et al.

[11] Patent Number: 5,373,438

[45] Date of Patent: Dec. 13, 1994

[54] SEQUENCE CONTROLLING METHOD

[75] Inventors: Hiroto Miyazaki, Kadoma; Toshihiro Ide; Akiho Hirahata, both of Hirakata, all of Japan

[73] Assignee: Matsushita Electric Industrial Co., Ltd., Osaka, Japan

[21] Appl. No.: 119,441

[22] Filed: Aug. 26, 1993

Related U.S. Application Data

[63] Continuation-in-part of Ser. No. 983,256, Nov. 30, 1992, abandoned, which is a continuation of Ser. No. 552,072, Jul. 13, 1990, abandoned.

Foreign Application Priority Data

Jul. 18, 1989 [JP] Japan .................................. 1-185552

[51] Int. Cl.$^5$ ............................................. G06F 15/46
[52] U.S. Cl. ...................................... 364/147; 364/140; 364/DIG. 2; 395/775
[58] Field of Search ............................. 364/140–147, 364/DIG. 2; 395/775

[56] References Cited

U.S. PATENT DOCUMENTS

| | | | |
|---|---|---|---|
| 4,432,047 | 2/1984 | Okayama | 364/147 |
| 4,441,161 | 4/1984 | Sasaki et al. | 364/147 |
| 4,621,317 | 11/1986 | Kudo et al. | 364/147 |
| 4,623,961 | 11/1986 | Mackewicz | 364/147 |
| 4,683,549 | 7/1987 | Takaki | 364/147 |
| 4,688,193 | 8/1987 | Yamaoka et al. | 364/147 |
| 5,005,152 | 4/1981 | Knutsen | 364/147 |

*Primary Examiner*—Jerry Smith
*Assistant Examiner*—Thomas E. Brown
*Attorney, Agent, or Firm*—Stevens, Davis, Miller & Mosher

[57] ABSTRACT

In the sequence program (ladder circuit), in order to give a common address between contacts of the ladder circuit longitudinally and store states before and after the processing of the contact in the ladder circuit, two types of memories corresponding to addresses at the both ends of the contact are provided and a compiler for classifying the processing into the five types and a sequence execution unit for processing a machine language of the compiler are further provided so that execution can be made even if an output instruction is provided in an intermediate portion of the ladder circuit.

2 Claims, 5 Drawing Sheets

F I G. 6
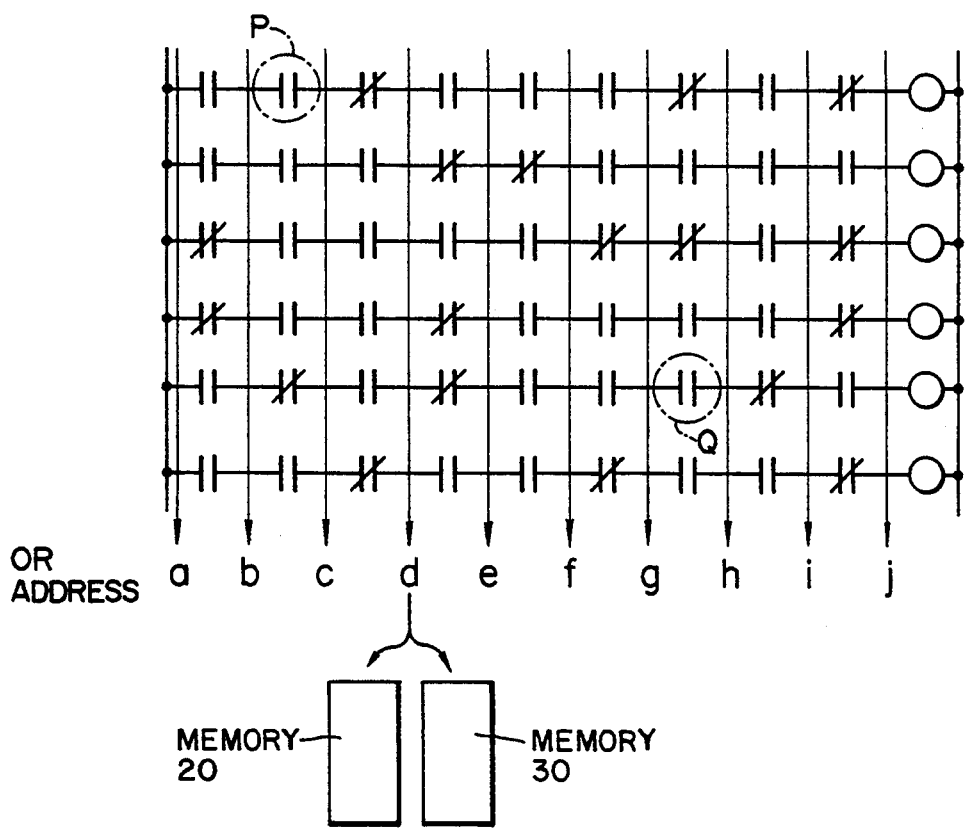
F I G. 7
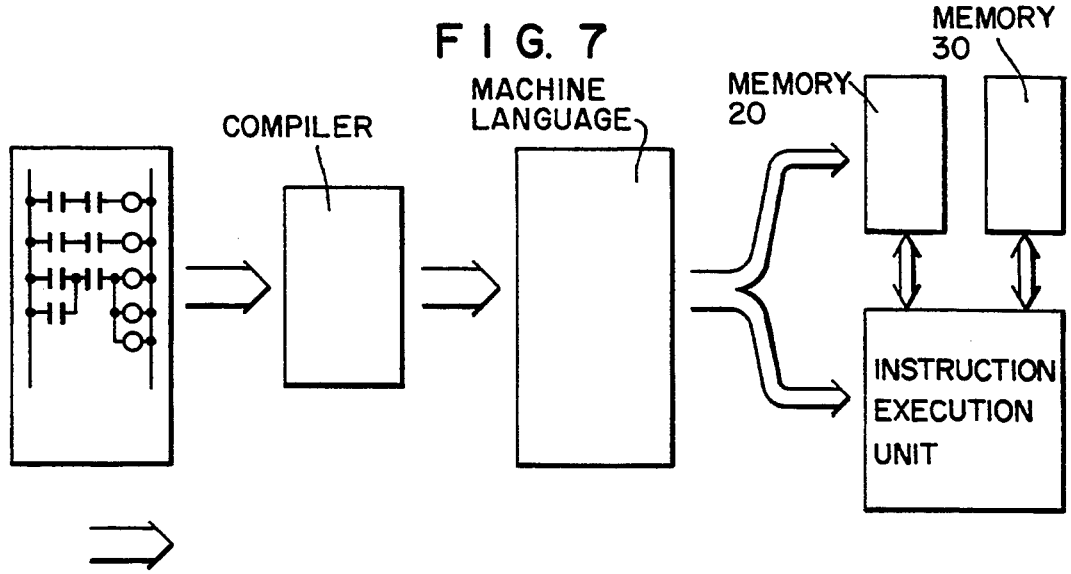

SEQUENCE CONTROLLING METHOD

This application is a continuation-in-part of application Ser. No. 07/983,256, filed Nov. 30, 1992 (abandoned), which is a continuation of application Ser. No. 07/522,072, filed Jul. 13, 1990 (abandoned).

BACKGROUND OF THE INVENTION

The present invention relates to a sequence controlling method for processing a sequence program (flowchart of a ladder circuit).

FIG. 2 shows an example of a sequence circuit for explaining the present invention and a prior art technique. FIG. 3 shows an example of a ladder circuit in the case where the sequence circuit of FIG. 2 is arranged by a sequence program (ladder circuit) in the prior art technique.

A conventional sequence controller assumes the processing form as shown in FIG. 3 in respect to the sequence circuit of FIG. 2 to process the sequence program (ladder circuit).

More particularly, when the sequence circuit includes a circuit in which an output constitutes an input condition for another output, the sequence program (ladder circuit) is divided into two or more ladder circuits as shown in FIG. 3 to process the sequence program.

With the above processing form, however, when the sequence circuit as shown in FIG. 2 is processed, the same address must be accessed twice in the processing of the ladder circuit. This is one of the factors resulting in reduced processing speed in the sequence control which requires a high-speed processing.

Further, since the same address is accessed twice, the number of program steps is also increased and a large memory capacity for storing a sequence program is also required.

SUMMARY OF THE INVENTION

Accordingly, it is an object of the present invention to provide a sequence controlling method, for controlling a circuit in which an output instruction is incorporated into an intermediate portion of a ladder diagram.

In order to achieve the above problem, the sequence controlling method according to the present invention comprises, in a sequence program (ladder circuit), a step of providing common addresses at both ends of a contact of the ladder circuit longitudinally, a step of providing two kinds of memories corresponding to the addresses at both ends of the contact for storing states before and behind the processing of the contact in the ladder circuit, a step of providing a compiler for translating the contact having the address into a machine language, a step of providing sequence executing means for processing the machine language, and a step of incorporating an output instruction into an intermediate portion in a lateral direction of the ladder circuit. It is noted that the ladder circuit is formed to include a number of OR circuits corresponding to the circuit to be controlled.

According to the sequence controlling method of the present invention, in the sequence program (ladder circuit), the executing means for processing the instruction translated into the machine language having the addresses at both ends of the contact by the compiler executes the output instruction, even if it is incorporated into the intermediate portion of the ladder circuit, and thereafter can process the ladder circuit consistently.

BRIEF DESCRIPTION OF THE DRAWINGS

FIG. 6 shows a ladder circuit showing addresses in the longitudinal direction; and FIG. 7 is a flowchart showing a processing of a sequence controller according to the embodiment.

DESCRIPTION OF THE PREFERRED EMBODIMENTS

An embodiment of the present invention will now be described with reference to a sequence program (ladder circuit) shown in FIG. 1.

Figure 4:
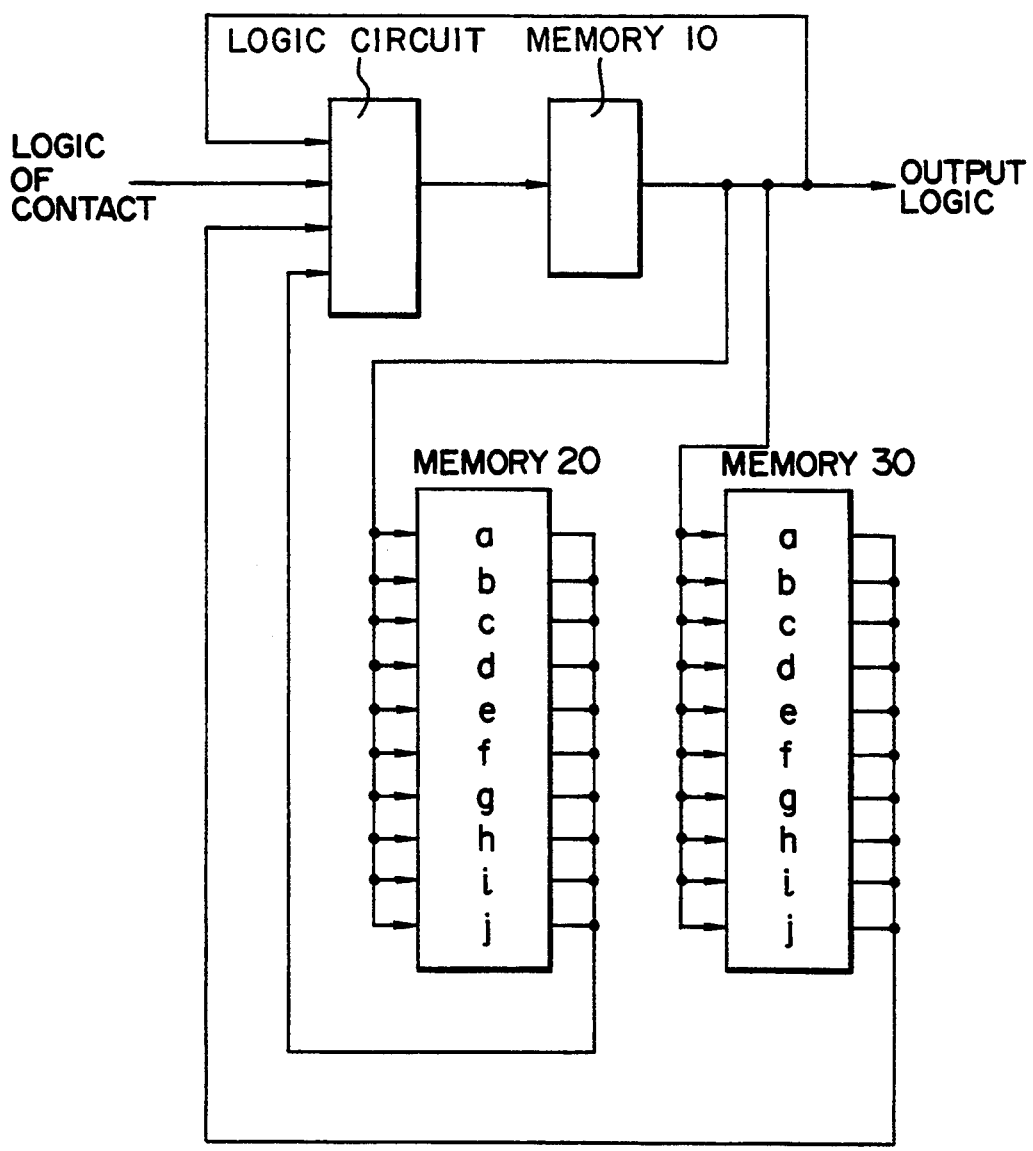
FIG. 4 is a block diagram of an apparatus according to an embodiment of the present invention.

FIG. 4 is a block diagram showing an embodiment of the present invention. Contents stored in a memory 10 of FIG. 4 represent a logic obtained until a portion to which a ladder circuit is currently processing. A memory 20 is provided to store a circuit logic existing to the left side of a contact of the ladder circuit. A memory 30 is provided to store a circuit logic existing to the right side of the contact of the ladder circuit.

Figure 1:
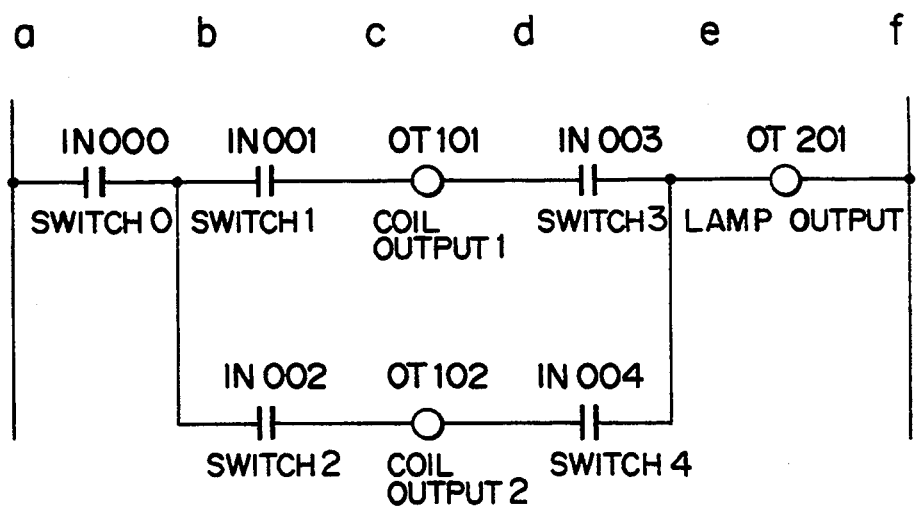
FIG. 1 shows an example of a ladder circuit to which the present invention can be implemented.
Figure 5:
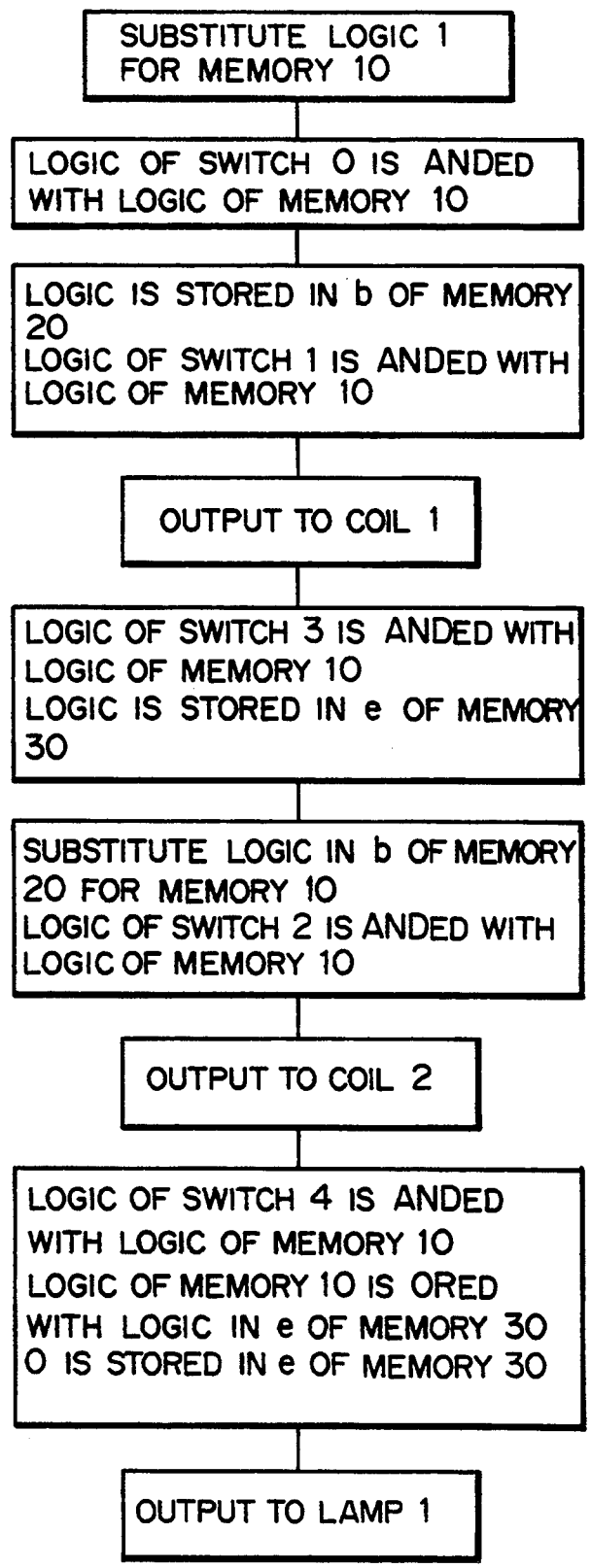
FIG. 5 is a flowchart showing an operation in the case where the sequence program (ladder circuit) of FIG. 1 is processed.

FIG. 5 is a flowchart showing processing in the case where the sequence program (ladder circuit) of FIG. 1 is processed. First, a logic 1 is substituted for the memory 10 or stored in the memory 10 at the beginning of the processing of the ladder circuit. The ladder circuit is then processed. A logic of a switch 0 is first ANDed with the logic stored in the memory 10. The logic in the memory 10 is substituted for or stored in a location indicated by an address b at the left side of a next contact in the memory 20 before processing of the next contact. Thus, a logic of a switch 1 is ANDed with the logic stored in the memory 10. Then, the contents stored in the memory 10 are produced to a coil output 1. A logic of a switch 3 is ANDed with the logic of the memory 10 and its resultant logic is substituted for or stored in a location indicated by an address e at the right side of a contact of the switch 3 in the memory 30. Then, a logic stored in a location indicated by the address b at the left side of a next contact in the memory 20 is substituted for or stored in the memory 10 before the processing of the next contact. Thereafter, the logic of a switch 2 is ANDed with the logic stored in the memory 10. The logic stored in the memory 10 is produced to a coil output 2. A logic of a switch 4 is ANDed with the logic stored in the memory 10, and the logic stored in the memory 10 is then ORed with the contents stored in the location indicated by the address e at the right side of a contact of the switch 4 in the memory 30 to store its resultant into the memory 10 with a logic 0 being substituted for or stored in a location indicated by the address e of the memory 30. Then, the logic stored in the memory 10 is produced to a lamp output 1.

FIG. 6 shows addresses in the longitudinal direction in the ladder circuit. For example, a contact P has an address b in the memory 20 and an address c in the memory 30. Further, a contact Q has an address g in the memory 20 and an address h in the memory 30.

FIG. 7 shows a processing flow of the sequence controlling method according to the embodiment.

In the embodiment, the processing sequence of the sequence program is determined as follows. In the sequence program (ladder circuit) as shown in FIG. 1, the sequence is basically established from the upper left portion toward the right portion. The number of the processing sequence begins to be given from the upper left portion. When an intersection (⊤, ⊣ or ┼) appears and a line under the intersection has another intersection in the form of ⌋, ┼ or ⊣, the operation of giving the number of the processing sequence is moved to the line disposed one line under the intersection and the same operation is repeated to determine the processing sequence of the ladder circuit.

Figure 2:
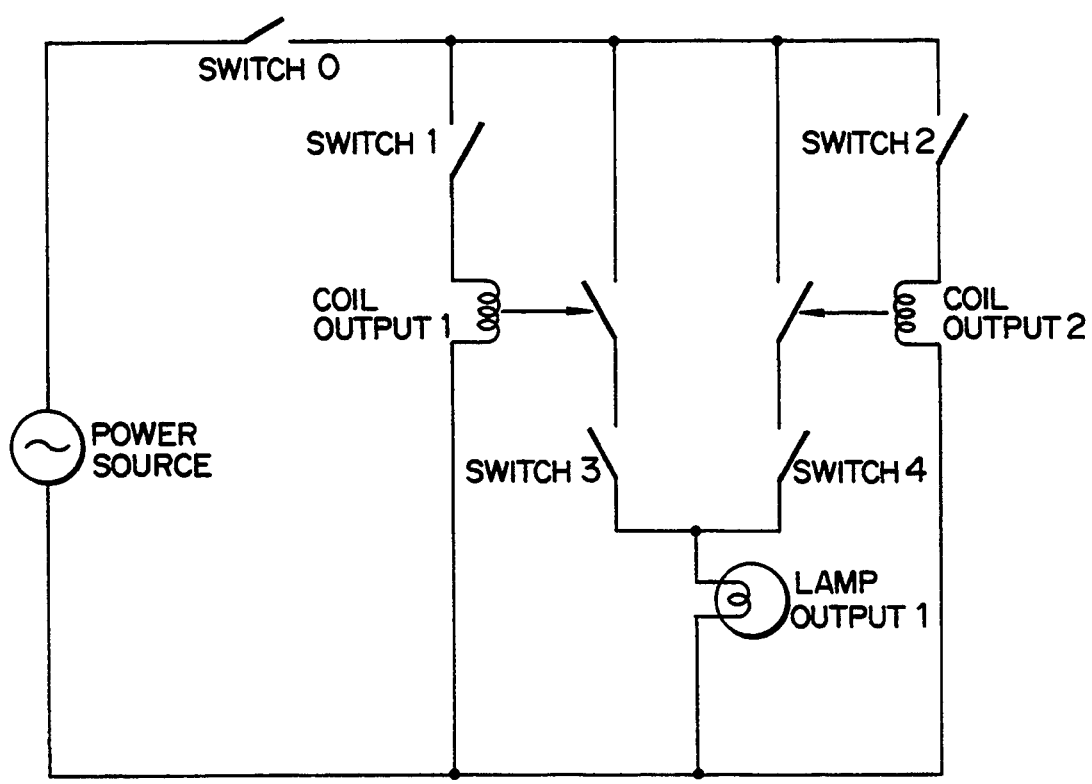
FIG. 2 shows an example of a sequence circuit for explaining the present invention and a prior art technique.
Figure 3:
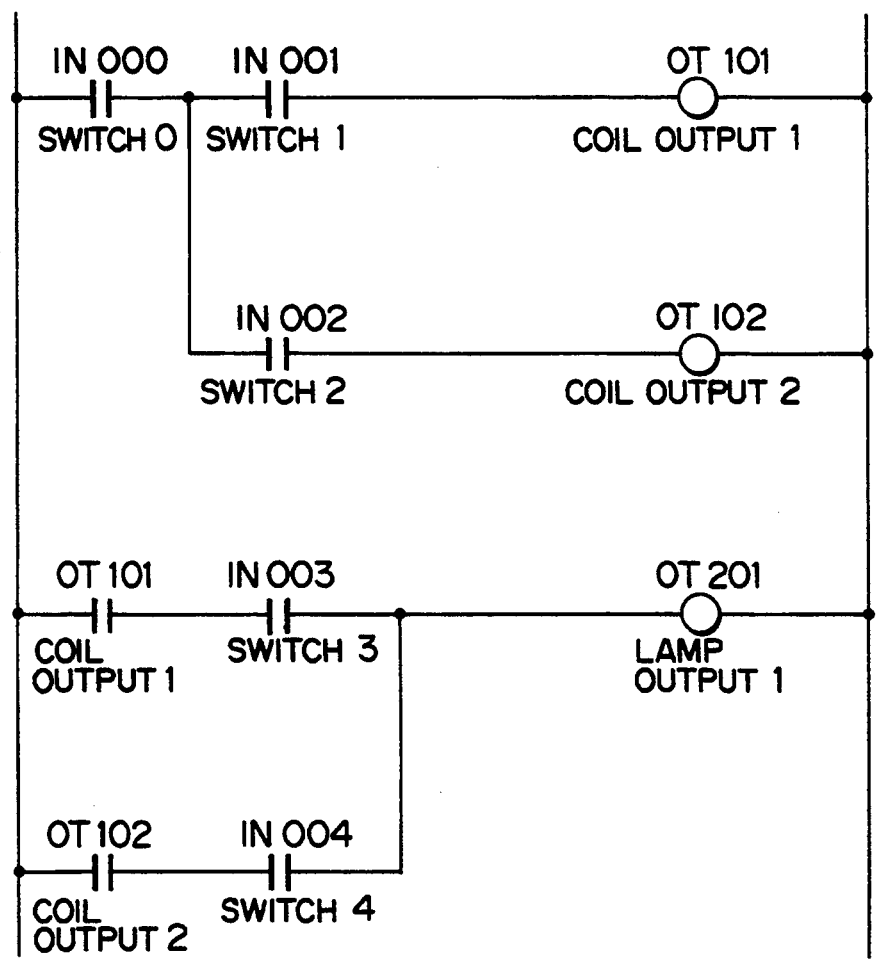
FIG. 3 shows an example of a ladder circuit in the case where the sequence circuit of FIG. 2 is arranged by a ladder circuit in a prior art technique.

A basic processing is now described. At the beginning of the ladder circuit, a logic 1 is stored in the memory 10 of FIG. 4, and contacts are repeatedly processed one by one (a logic of a contact is ANDed with the logic in the memory 10 to store its resultant into the memory 10). Thus, if switch 0 of FIGS. 1 and 2 is open, a logical 0 is substituted in memory 10, and thereafter the processing of each contact will result in a logical 0 being produced. On the other hand, if switch 0 is closed, a logical 1 is substituted in memory 10; thereafter, in response to any switch in a loop being open, a logical 0 will then be substituted in memory 10, and processing of each subsequent contact in that loop will result in a logical 0 being produced. In other words, whenever an open switch is encountered in a loop, the state of memory 10 will thereafter be 0 and the processing of all subsequent contacts in that loop will produce a logical 0. In the case of an output instruction, the logic in the memory 10 is produced.

The special processing for a contact is now described and is classified into five types depending on configurations at the both ends of the contact as follows.

1. In the case where ⊤ is connected to the left side of the contact:

Before the processing of the contact, the logic (stored in the memory 10 of FIG. 4) of the ladder circuit obtained until the contact is reached is stored in a location designated by an address which the contact has in the memory 20 of FIG. 4.

2. In the case where ⊢, ⊥, ┼ or ⊔ is connected to the left side of the contact:

Before the processing of the contact, the logic stored in the location designated by the address which the contact has in the memory 20 of FIG. 4 is Substituted or stored in the memory 10.

3. In the case where ⊤ is connected to the right side of the contact:

After the processing of the contact, the logic (stored in the memory 10 of FIG. 4) obtained after the contact is processed is stored in a location designated by an address which the contact has in the memory 30 of FIG. 4.

4. In the case where ⊣ or ┼ is connected to the right side of the contact:

After the processing of the contact, the logic (stored in the memory 10 of FIG. 4) obtained after the contact is processed is ORed with an address which the contact has in the memory 30 of FIG. 4 to store its resultant into a location designated by an address which the contact has in the memory 30 of FIG. 4.

5. In the case where ⊥ or ⌋ is connected to the right side of the contact:

After the processing of the contact, the logic (stored in the memory 10 of FIG. 4) obtained after the contact is processed is ORed with an address which the contact has in the memory 30 of FIG. 4 to substitute its resultant for the contents in the memory 10 of FIG. 4, that is, store its resultant into the memory 10 of FIG. 4.

When the sequence program of FIG. 1 is processed by the sequence controller of the embodiment in accordance with the above method, the processing form having the processing sequence as shown by the algorithm of FIG. 5 is formed. As mentioned above, the special processing for a contact is classified into five types, and these types are distinguished by applying three kinds of addition signals to a contact as indicated below:

(1) In the case where connection status ⊤ exists to the left side of the contact;

(2) In the case where connection status ⊤, ⊣ or ┼ exists to the right side of the contact; and (3) In the case where the connection status ⊥ or ⌋ exists to the right side of the contact.

As described above, in the sequence program (ladder circuit), in order to give a common address between contacts of the ladder circuit longitudinally and store states before and after the processing of the contact in the ladder circuit, two types of memories corresponding to addresses at the both ends of the contact are provided and a compiler for classifying the above processing sequence and the five types of processing forms and a sequence execution unit for processing a machine language of the compiler are further provided so that execution can be made even if an output instruction is provided in an intermediate portion of the ladder circuit. With such processing states as mentioned above, the contacts are processed one-by-one without use of a push-pop instruction. Since the push-pop instruction is not used, a stack memory is not necessary and an indefinite number of OR circuits are formed.

As described above, in the sequence program (ladder circuit), in order to give a common address between contacts of the ladder circuit longitudinally and store states before and after the processing of the contact in the ladder circuit, two types of memories corresponding to addresses at both ends of the contact are provided and a compiler for classifying the processing into the five types and a sequence execution unit for processing a machine language of the compiler are further provided so that execution can be made even if an output instruction is provided in an intermediate portion of the ladder circuit, whereby the sequence program can be assembled by decreased number of steps and the processing speed is increased.

We claim:

1. A sequence controlling method comprising:
providing common addresses at both ends of a contact of a ladder circuit longitudinally, said ladder circuit having plural contacts;
forming an indefinite number of OR circuits;
providing two types of memories, to process one of said OR circuits, corresponding to the addresses at both ends of one of said contacts for storing states before and after processing of said one of said contacts; and
processing said contacts one-by-one including:

applying three kinds of addition signals to said one of said contacts;

translating said one of said contacts having the three kinds of addition signals applied thereto and the addresses into a machine language;

processing the machine language; and incorporating an output instruction into an intermediate portion in a lateral direction of the ladder circuit.

2. A sequence controlling method for controlling a circuit, said method comprising:

forming a ladder circuit wherein common addresses are provided at both ends of the contacts of the ladder circuit longitudinally and wherein said ladder circuit (a) includes plural contacts, (b) includes a number of OR circuits corresponding to the circuit to be controlled and (c) incorporates an output instruction into an intermediate portion in a lateral direction of the ladder circuit;

providing two types of memories, to process said OR circuits, corresponding to the addresses at both ends of said contacts for storing states before and after processing of each one of said contacts; and processing said contacts one-by-one including:

applying three kinds of addition signals to said contacts;

translating said contacts having the three kinds of addition signals applied thereto and the addresses into a machine language; and processing the machine language.

* * * * *